US005893793A

United States Patent [19]
Nishio et al.

[11] Patent Number: 5,893,793
[45] Date of Patent: Apr. 13, 1999

[54] PROCESS AND APPARATUS FOR CHUCKING AND MACHINING AN ELONGATED CYLINDRICAL ARTICLE MADE OF A CERAMIC MATERIAL

[75] Inventors: Akifumi Nishio, Nagoya, Japan; Carine Anne-Marie Claudine Dewitte, Ottignies; Jeffrey Philip John Pattimore, Baudour, both of Belgium

[73] Assignees: NGK Insulators, Ltd., Japan; NGK Ceramic Europe S.A., Belgium

[21] Appl. No.: 08/943,013

[22] Filed: Oct. 2, 1997

[30] Foreign Application Priority Data

Oct. 2, 1996 [JP] Japan .................................. 8-261706

[51] Int. Cl.$^6$ ........................................................ B23B 5/22
[52] U.S. Cl. ........................... 451/49; 451/397; 82/165; 82/45; 82/106
[58] Field of Search ........................ 451/397, 398, 451/49, 252; 82/1.11, 165, 170, 150, 151

[56] References Cited

U.S. PATENT DOCUMENTS

| 2,195,051 | 6/1940 | Wallace ..................... 451/397 |
| 3,093,942 | 6/1963 | Snyder . | |
| 4,141,263 | 2/1979 | Leutgab ..................... 82/45 |
| 5,230,265 | 7/1993 | Schmid ..................... 82/106 |
| 5,259,156 | 11/1993 | Ronen ..................... 451/397 |
| 5,337,521 | 8/1994 | Heyl et al. ..................... 451/397 |
| 5,339,521 | 8/1994 | Kawase . | |

FOREIGN PATENT DOCUMENTS 88 07 944   8/1988   Germany .

Primary Examiner—David A. Scherbel
Assistant Examiner—Shantese McDonald
Attorney, Agent, or Firm—Parkhurst & Wendel, L.L.P.

[57] ABSTRACT

A process for chucking and machining an elongated cylindrical article made of a ceramic material according to the present invention, comprises the steps of: (1) chucking the elongated cylindrical ceramic article between chuck heads at longitudinally opposite end portions of said ceramic article; (2) holding the elongated cylindrical article between the chuck heads under such a low chucking pressure as allowing the ceramic article to slip inside a driven side chuck head while being kept inside the chuck heads at the opposite end portions, and slipping the ceramic article inside the chuck heads for a given time under rotation of a driving chuck head so that any positional deviation between the location of a center axis passing centers of of the chuck heads and an axis of the ceramic article may be removed due to a self aligning centrifugal action of the ceramic article; (3) raising the chucking pressure of the chuck heads to such a level as required for machining the ceramic article; and (4) then machining a surface of the ceramic article by a machining tool.

7 Claims, 4 Drawing Sheets

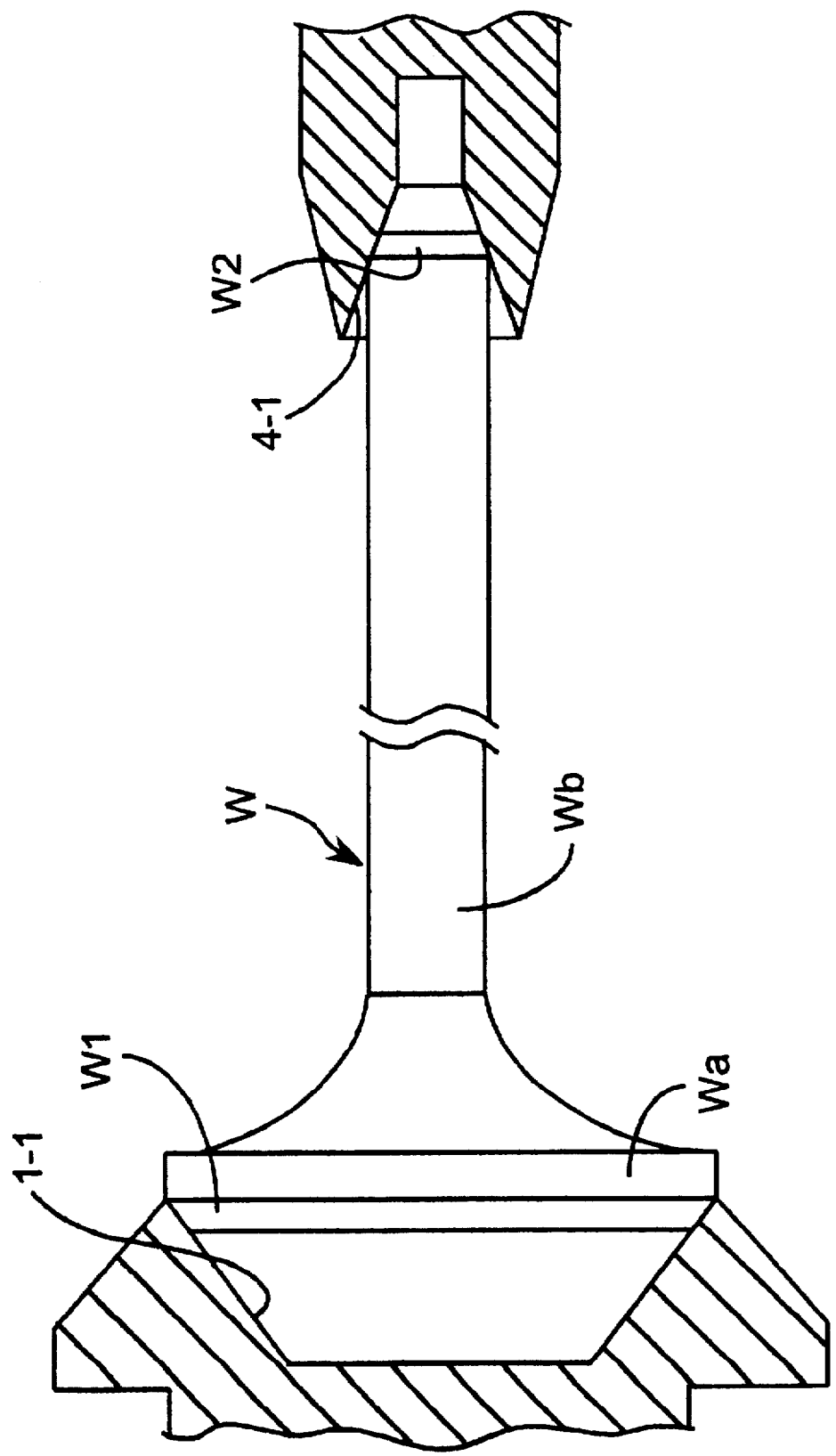

PROCESS AND APPARATUS FOR CHUCKING AND MACHINING AN ELONGATED CYLINDRICAL ARTICLE MADE OF A CERAMIC MATERIAL

BACKGROUND OF THE INVENTION

1. Field of the Invention

The present invention relates to a process and an apparatus for chucking and machining an elongated cylindrical ceramic article.

1. Related Art Statement

When an elongated cylindrical article such as an engine valve-forming article is to be ground by a cylindrical grinder, it is a conventional practice that the workpiece is manually or automatically placed between a pair of chuck heads, chucked by means of a general purpose scroll chuck or opposite centers, and machined.

FIGS. 1 and 2 is a schematic view of a chucking and machining apparatus for the illustration of a conventional chucking process. According to this chucking and machining apparatus, a driving side chuck head 1 is rotatably supported by a support pole 2 at one side, and is to be rotated by a motor 3. At the other side, a rotatable tailstock 4 (driven side chuck head 4) installed at one end of a chucking pressure applicator 5. An air circuit 6 is connected to the other end of the chucking pressure applicator 5 so that a desired chucking pressure may be applied between the chucking heads 1, 4 via the chucking pressure applicator 5. The air circuit 6 is to be adjusted such that warping of the workpiece by the chucking pressure may be made smaller. The chucking pressure applicator 5 includes a cylindrical recess 5-1 formed in a support pole 7 and a piston 5-2 fitted slidably to-and-fro in the cylindrical recess 5-1 so that the chucking pressure applicator 5 may be supported and moved to-and-fro by the support pole 7. The support pole 7 is slidably and fixedly installed on a base 8 by a moving unit not shown, for example, an oil pressure device.

When a ceramic engine valve having a head diameter of 32 mm, a shaft diameter of 7.3 mm and an entire length of 109 mm as a workpiece W is to be chucked by using this chucking and machining apparatus, the workpiece W is placed between a pair of the chuck heads manually or by means of an automatic carrier, and its one end is pressed against the driving side chuck head 2 at one side (See FIGS. 1(a) and 1(b)). Then, the support pole 7 is slid in a left direction in these figures to contact the other end of the workpiece W against the driven side chuck head 5. Thereafter, the support pole 7 is fixed to the base 8 (See FIG. 1(c)). At that time, the air chuck 6 is set such that a given chucking pressure may be applied between the chuck heads 1 and 5. The driving side chuck head 1 is rotated by the motor 3, and the engine valve fixedly chucked between the chuck heads under the above chucking pressure is rotated. While the engine valve is being rotated, the surface of the engine valve is machined by a grinding tool T schematically illustrated in FIG. 1(c).

FIG. 2 is a view for illustrating a chucked state of the workpiece W in FIG. 1(c). As illustrated, frusto-conical chucking recesses 1-1, 4-1 are provided at the chucking heads 1, 4, respectively so that their conical peripheral surfaces may function as chucking faces. Beveled portions W1 and W2 are provided at an axially outer peripheral area of a large-diameter head seat portion Wa and that of a small-diameter shaft portion Wb, respectively, and are contacted with and supported by the chucking recesses 1-1 and 4-1, respectively.

SUMMARY OF THE INVENTION

The present inventors have discovered that the elongated cylindrical ceramic article such as the ceramic engine valve was chucked and machined by the above conventional process, a satisfactory machining precision could not be always obtained if a very high precision is required. That is, if the location of the center of the automatic carrier is deviated from that of the center axis passing the centers of the chuck heads or if the shape of the shaft portion Wb of the workpiece W before the machining is warped and when the workpiece W is chucked and fixed between the chuck heads, the workpiece is chucked in the state that the central axis of the workpiece W is deviated form the location of the center axis passing the centers of the chuck heads. Consequently, bending stress acts upon the workpiece. As a result, the shaft portion Wb of the workpiece is warped by the chucking force, and the workpiece is machined in this state. When the workpiece is machined and the chucked state of the workpiece is not released, the large-diameter head portion (seat portion) Wa is hardly deviated from the shaft portion Wb used as a reference axis. However, when the machined workpiece W is removed from the chuck heads, bending force applied to the workpiece W is released so that the workpiece is deformed and the large-diameter portion (seat portion) Wa is deviated from the shaft portion Wb used as the reference axis. That is to say, the workpiece axis deviates from the machining axis when the pressure is released. The present inventors discovered that the satisfactory result could not be always obtained if a high accuracy is required for a perpendicularity between the shaft portion and the seat portion.

The present inventors tried to machine the workpiece in the state that the chucking pressure was lowered from 5 bars ordinarily employed in the case of the engine valves to, for example not more than 2 bars or less so as to prevent the workpiece from being warped by the chucking force when the workpiece was chucked. In this case, however, a problem occurs that the workpiece slipped out from the chuck heads during the machining or even though the workpiece did not slip out from the chuck heads, an accurate machining amount could not be attained because the workpiece was warped by the machining force during the machining. Further, it was clarified that when the chucking pressure was set at more than 2 bars, the warping of the workpiece due to the machining force during the machining could be reduced as compared with a case where the machining was effected at the chucking force of not more than 2 bars. It was also clarified that even in that case, when the chucking was released after the machining, the warping of the head seat portion was still large relative to the shaft portion of the workpiece as the reference, and that the high accuracy required could not be realized.

On the other hand, the inventors also tried to arrange the workpiece W between the chuck heads at a location of the chucking center by increasing the latitude of the automatic carrier. However, it was clarified that the positional accuracy of the chucking and fixing portion at the chucking face varies, depending upon the shape of the sintered ceramic body, when in chucking and machining, and consequently the positional accuracy between the location of the chucking center and the axis of the workpiece occurred.

In view of the above problems, it is an object of the present invention to provide a process and an apparatus for chucking and machining an elongated cylindrical ceramic article, which enable high accuracy machining relative to an axis of the elongated cylindrical ceramic article as a reference without substantially exerting bending force upon the ceramic article in the state that the ceramic article is being chucked.

The process for chucking and machining an elongated cylindrical article made of a ceramic material according to the present invention, comprises the steps of: (1) chucking the elongated cylindrical ceramic article between chuck heads at longitudinally opposite end portions of said ceramic article; (2) holding the elongated cylindrical article between the chuck heads under such a low chucking pressure as allowing the ceramic article to slip inside a driven side chuck head while being kept inside the chuck heads at the opposite end portions, and slipping the ceramic article inside the chuck heads for a given time under rotation of a driving chuck head so that any positional deviation between the location of a center axis passing the centers of the chuck heads and an axis of the ceramic article may be removed due a self-aligning centrifugal action of the ceramic article; (3) raising the chucking pressure of the chuck heads to such a level as required for machining the ceramic article; and (4) then machining a surface of the ceramic article by a machining tool.

The apparatus for chucking and machining an elongated cylindrical article made of a ceramic material according to the present invention comprises: a pair of chuck heads for chucking longitudinally opposite end portions of the elongated cylindrical ceramic article; an applicator for applying a given chucking pressure upon the chuck heads; a switch for switching the chucking pressure; a driving unit for rotating the chuck heads; and a machining tool for machining the elongated cylindrical ceramic article chucked by the chuck heads;

wherein the chucking pressure switch is switched; the elongated cylindrical ceramic article is held between the chuck heads under such a given low chucking pressure as to enable the ceramic article to slip within a driven side chucking head and the driving side chuck head is rotated to slip the elongated cylindrical ceramic article within at least the driven side chuck head so that any positional deviation between the position of a center axis passing the centers of the chuck heads and the location of the axis of the elongated cylindrical ceramic article within the chuck heads may be removed; then the chucking pressure is raised to a given higher chucking pressure required for machining; and in this state a surface of the elongated cylindrical ceramic article is machined by the machining tool.

According to the process and the apparatus for chucking and machining an elongated cylindrical ceramic article in the present invention, (1) the elongated cylindrical ceramic article is chucked between chuck heads at longitudinally opposite end portions of said ceramic article; the elongated cylindrical article is held between the chuck heads under such a low chucking pressure as allowing the ceramic article to slip inside a driven side chuck head while being kept inside the chuck heads at the opposite end portions, and the ceramic article can slip inside the chuck heads for a given time under rotation of a driving chuck head so that any positional deviation between the location of a center axis passing the centers of the chuck heads and an axis of the ceramic article may be removed due to a self aligning centrifugal action of the ceramic article; (3) the chucking pressure of the chuck heads is raised to such a level as required for machining the ceramic article; and then a surface of the ceramic article is machined by the machining tool. Therefore, the elongated cylindrical ceramic article can be machined at a high accuracy with respect to the axis of the elongated cylindrical ceramic article as a reference. The "elongated cylindrical ceramic article"0 referred to in the present specification, which is a cylindrical article fundamentarily having a rotary symmetrical shape and having a large length and a small diameter, may include, for example, a ceramic engine valve, a ceramic tube, a ceramic support pin jig, an all-ceramic turbo rotor, etc. The term "cylindrical" article used in this application includes a "solid" cylindrical article and a "hollow" cylindrical article. The term "slip" means that an end portion of the elongated cylindrical article to be chucked slips on a chucking surface of the chuck head in a rotating direction and/or in a rotation axis direction.

BRIEF DESCRIPTION OF THE DRAWINGS

For a better understanding of the invention, reference is made to the attached drawings, wherein;

FIG. 2 shows the state in detail in which the workpiece W is chucked between the chuck heads at the opposite ends thereof;

DETAILED DESCRIPTION OF THE INVENTION

In the following, preferred embodiments of the process and the apparatus for chucking and machining the elongated cylindrical ceramic article in the present invention will be recited by way of example.

(1) The elongated cylindrical ceramic article is an engine valve made of the ceramic material and having a shaft portion and a head portion. The process and the apparatus for chucking and machining the elongated cylindrical ceramic article in the present invention are suitable particularly for chucking and machining the ceramic engine valve.

(2) The chuck head-rotating unit is provided at one of the chuck heads. There is an advantage that one chuck head-rotating unit enables the elongated cylindrical ceramic article to be appropriately chucked and machined.

(3) The chucking pressure applicator is provided at the other chuck head, and the given chucking pressure is always applied to the other chuck head in a chucking direction thereof when the apparatus is in operation. By so doing, the elongated cylindrical ceramic article can be Immediately chucked and machined, so that the chucking and machining can be continuously effected. Thereby, the machined elongated cylindrical ceramic articles can be advantageously mass-produced.

(4) At least one of the chuck heads is made of a material softer than a ceramic material constituting the elongated cylindrical ceramic material. By so doing, the workpiece wears the chuck head to remove the positional deviation between the location of the center axis passing the centers of the chuck heads and the location of the axis of the elongated cylindrical ceramic article. Further, even if a slight positional deviation remains between the location of the centers of the chuck heads and the location of the axis of the elongated cylindrical ceramic article and the after the adjustment through the slipping, the chuck head in concern is deformed to eliminate such a positional deviation through absorption thereof. In addition, since the workpiece is pressed under a given pressure by the chucking heads even if the chuck head in concern is worn, such wearing will not adversely affect the chucked state of the workpiece. For example, if an appropriate material is used for the chuck head, it is possible to suppress the worn amount thereof to about 30 μm even after eight hundreds of the elongated cylindrical ceramic articles are machined. In such a case, a total displacement of the chuck heads with the air pressure will be about 11 mm, which will mean that such a chuck can be used until about 290,000 of the elongated cylindrical ceramic articles are machined.

In the following, specific embodiments of the present invention will be explained.

Figure 1A:
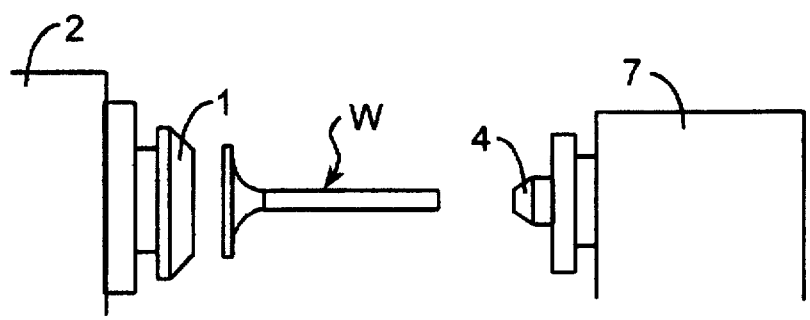
FIG. 1(a) shows the state in which the ceramic elongated cylindrical ceramic article as a workpiece W is placed between chuck heads of the chucking and machining apparatus.
Figure 1B:
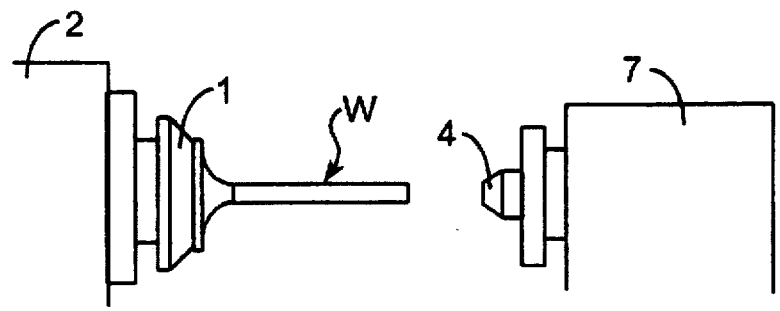
FIG. 1(b) shows the state in which the workpiece W is contacted to one of the chuck heads.
Figure 1C:
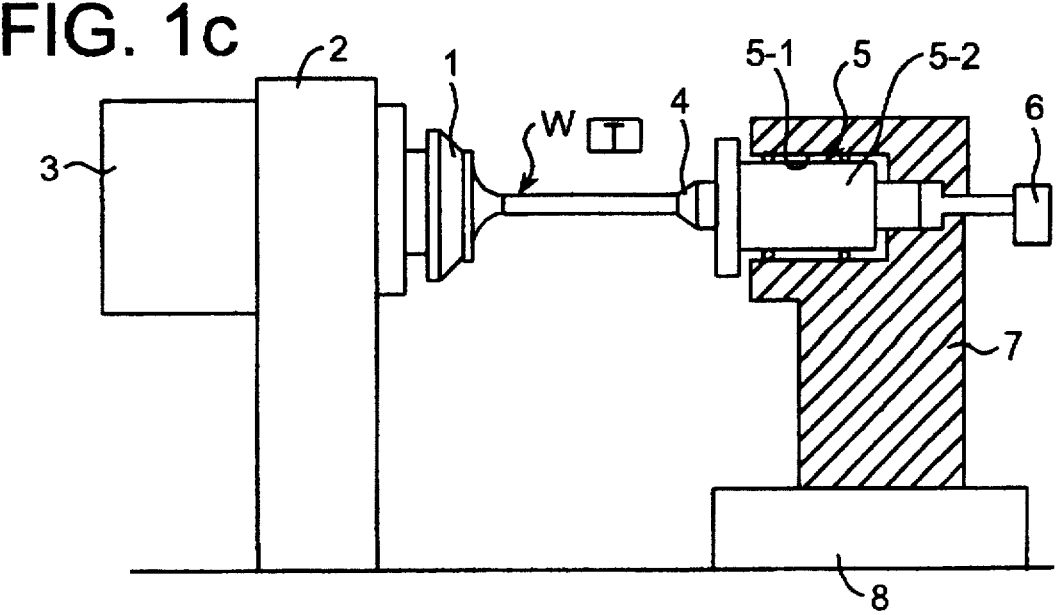
FIG. 1(c) shows the state in which the workpiece W is chucked between the chuck heads at the opposite ends thereof.

The process and the apparatus for chucking and machining an elongated cylindrical ceramic article in the present invention are improvements on the conventional process and apparatus explained in FIGS. 1(a) and 1(b) and FIG. 2. Since the workpiece is carried, chucked and machined even according to the present invention in almost the same manner as illustrated above in the conventional technique, differences between the present invention and the conventional technique will be mainly explained below, the remaining points being relied upon the above mentioned explanation.

Figure 3:
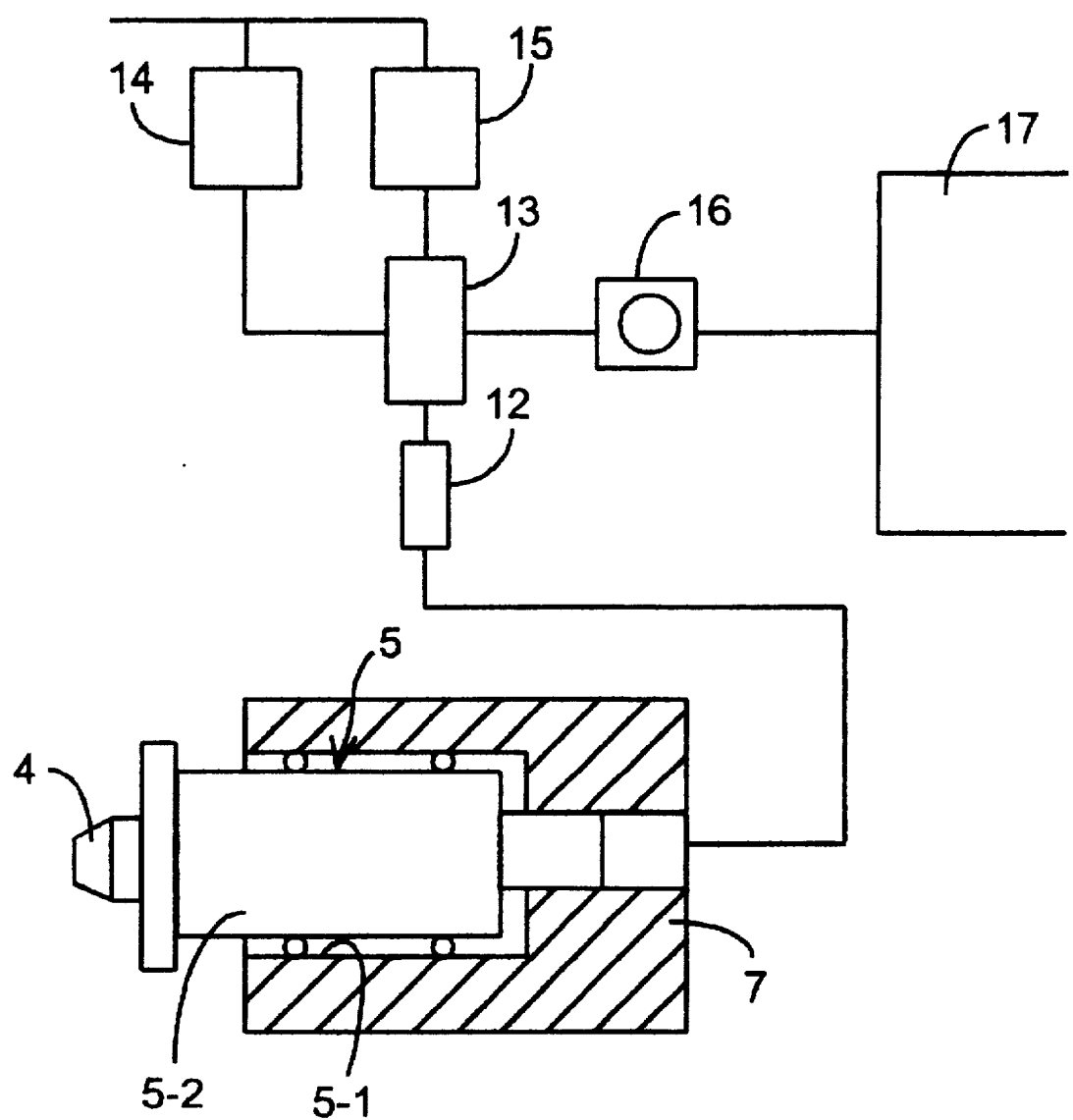
FIG. 3 is a schematic view for illustrating a chucking pressure applicator and a chucking pressure setting mechanism of the apparatus for chucking and machining the elongated cylindrical ceramic article according to the present invention.

In the conventional technique, the chucking pressure applicator which applies a given chucking pressure between the chuck heads is constituted by the air circuit 6. This air circuit 6 is to apply and maintain a given chucking pressure between the chuck heads. As shown in FIG. 3, according to the present invention, the chucking pressure may be set and maintained at two stages. More specifically, the chucking pressure applicator 5 includes a cylindrical recess 5-1 formed in a support pole 7, and a piston 5-2 arranged slidably to-and-fro in the cylindrical recess 5-1. A head chuck 4 is fitted to a front end portion of the chucking pressure applicator 5, whereas a rear end portion of the chucking pressure applicator 5 is connected and communicated with a switching electro-magnetic valve 13 via a flow rate control valve 12 which control the increase and decrease rates in the chucking pressure. The electromagnetic valve 13 is connected to pressure control valves 14, 15 for controlling the chucking pressure at two stages so that the valve 13 may electrically switch and open or close the pressure control valves 14, 15. Connected to the electromagnetic valve 13 is a timer 16 for controlling the timing when the switching is effected. Connected to the timer 16 is a chucking pressure controller 17 to receive on/off signals for the chuck head-driving motor and to feed its information upon the timer 16. The pressure control valve 14 is a pressure control valve which is to set and maintain the chucking pressure at such a lower level as to hold the elongated cylindrical ceramic article between the chuck heads and to allow the ceramic article to slip within the driven side chuck head. On the other hand, the pressure control valve 15 is a pressure control valve which is to to set and maintain the chucking pressure at such a higher level as to enable suitable machining of the elongated cylindrical ceramic article. These two pressure control valves 14 and 15 are connected to a compressed gas feed source not shown, on an opposite side of the electromagnetic valve 13. In the case of the engine valve explained in connection with FIGS. 1(a) and 1(b) and FIG. 2, for example, the set chucking pressure of the pressure control valve 14 is 0.5 bar, whereas that of the pressure control valve 15 is 5 bar. The pressure of the compressed gas source is set at 10 bar.

Next, the above chucking pressure-setting mechanism will be explained.

While the electromagnetic valve 13 turns off the pressure control valve 15, the pressure control valve 14 is connected with the rear end portion of the chucking pressure applicator 5 via the electromagnetic valve 13 and the flow rate control valve 12 so that the preset chucking pressure of 0.5 bar may be always applied to the workpiece W via the chuck heads. The support pole 7 is moved to its standard position where the elongated cylindrical ceramic article carried by the automatic carrier not shown is held between the chuck heads 1 and 4. The chucking pressure is maintained at 0.5 bar by the chucking pressure control valve 14. In this state, when the elongated cylindrical ceramic article is rotated through the chuck head 1 by actuating the chuck head-driving motor 3, a start signal of the motor is fed to the chucking pressure controller 17, and then an electric signal is fed from the controller 17 to the timer 16. Then, the timer 16 starts measuring the time. For a given preset time period, the workpiece W slips in the rotatable tailstock side chuck head so that the axis of the workpiece W may be aligned with the location of the center of the rotatable tailstock head. The above given preset time period may be for example 1 second when counted from the start of the rotation of the chuck head 1. After the given preset time period passed, the timer 16 outputs an electric signal to the electromagnetic valve 13 to order the valve 13 to turn on the pressure control valve 15. Then, the valve 13 turns on the pressure control valve 15. As a result, the flow passage through the pressure control valve 14 is closed, and that through the pressure control valve 15 is switched on. Thereby, the pressure at the rear end of the piston 5-2 is raised to 5 bars via the flow rate control valve 12 within a given time period, for example, not longer than 2 seconds before the machining tool T such as a grinding stone reaches its machining point. Thus, the chucking pressure is transmitted to the chuck piston 5-2 to apply the chucking pressure of 5 bars between the chuck heads 1 and 4. While the workpiece is set at a chucked state suitable for machining, the surface of the elongated cylindrical ceramic article is machined by the machining tool T. As mentioned above, according to the present invention, it is necessary that before the machining tool reaches its machining point, the elongated cylindrical ceramic article slips within the rotatable tailstock under the chucking pressure of for example, 0.5 bar, the alignment is effected between the axis of the workpiece W and the location of the center of the rotatable tailstock, and then the chucking pressure is raised to a level suitable for the machining, and the above machining step is terminated.

Next, when the chuck head-driving motor 3 is turned off after the termination of the machining, a stop signal of the motor is outputted to the chucking pressure controller 17, and in turn an electric signal is outputted from the controller 17 to the timer 16. Thereby, the electromagnetic valve 13 turns off the pressure control valve 15 so that the flow passage through the pressure control valve 15 may be closed, whereas that through the pressure control valve 14 is switched on to change the pressure applied to the chuck piston from 5 bars to 0.5 bar. After the elongated cylindrical ceramic article is held by the automatic carrier not shown, the support pole 7 supporting the chuck head 4 is outwardly moved on the base 8 to release the chucked state and take out the machined elongated cylindrical ceramic article from the chucking and machining apparatus. By repeating the above steps, the elongated cylindrical ceramic articles can be continuously chucked and machined.

Figure 4:
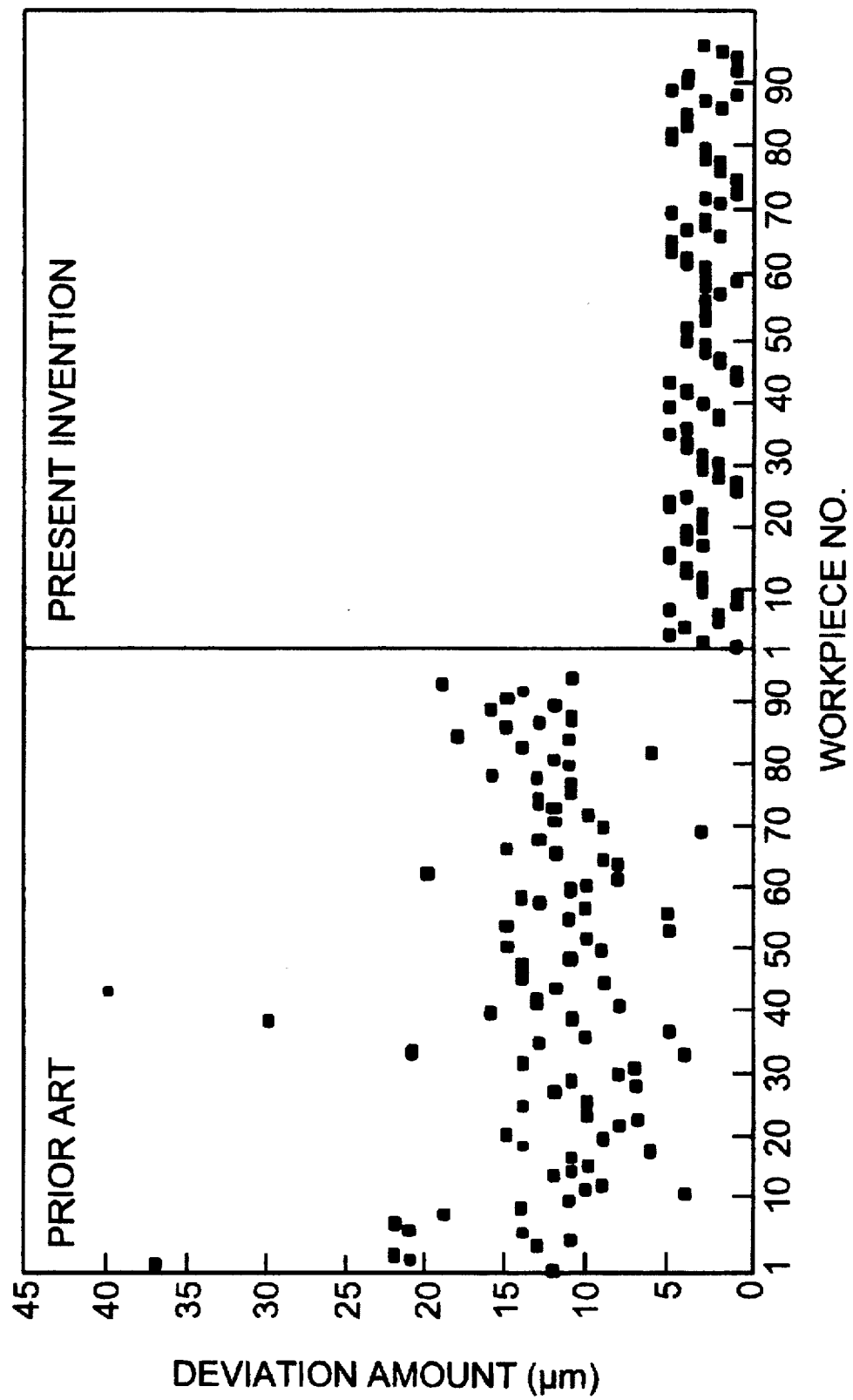
FIG. 4 is measurement results of the deviations of the head seat portions of ceramic engine valves as workpieces W each having a head diameter of 31 mm, a shaft diameter of 7.3 mm and an entire length of 105 mm, relative to the axis of the shaft portion of the ceramic engine valve as a reference with respect to the conventional process (chucked and machined under one stage chucking pressure) and the invention one (chucked and machined under two stage chucking pressures).

In FIG. 4 are shown measurement results of the deviation of the head seat portion relative to the axis of the shaft portion of the ceramic engine valve as a reference with respect to the conventional process and the invention one. As the workpieces W were used ceramic engine valves each having a head diameter of 30 mm, a shaft diameter of 7 mm and an entire length of 110 mm. In the conventional process, the engine valves were chucked and machined in the state that the chucking pressure was set at one level of 5 bars. The invention process was carried out in the same manner as mentioned above, that is, the workpiece slipped in the rotatable tailstock under the chucking pressure of 0.5 bar for one second, the chucking pressure was changed to 5 bars within 2 seconds so that the workpiece might not be warped, and the machining of the workpiece was started and terminated in the state that the sufficient chucking pressure was applied to the workpiece. The machining pressure was about 6 kg/mm$^2$ (grinding resistance in a normal direction), and the ground amount of the workpiece was about 0.3 mm as expressed in change of the diameter. In FIG. 4, the figures of the abscissa denote the numbers of workpieces, and the ordinate denote the amount of the deviation of the workpiece. As is clear from FIG. 4, the deviations of the workpieces in the conventional process largely varied up to the maximum of 40 μm, whereas according to the present invention, the deviations of the workpieces could be suppressed to not more than 5 μm. Further, it was clarified that the chucking and machining process according to the present invention can be carried out in the continuous machining in the mass production without influencing the machining cycle time required in the conventional process.

Further, it was clarified that when the process according to the present invention was carried out under the above chucking and machining condition with respect to ceramic engine valves each having a head diameter of 25 to 60 mm, a shaft diameter of 5 to 9.5 mm and an entire length of 90 to 150 mm, the deviations of the head seat portions of the engine valves relative to the axis of the shaft portions as the reference can be suppressed to not more than 10 μm.

It is obvious to the skilled person in the art that although in the above Experiments, the chucking pressure was adjusted at two stages, the chucking pressure may be adjusted at three or more stages. It must be understood that such three or more stage adjustment of the chucking pressure are included in the process and the apparatus for chucking and machining the elongated cylindrical ceramic articles according to the present invention.

As having been explained in the above, according to the process and the apparatus for chucking and machining the elongated cylindrical ceramic articles in the present invention, (1) the elongated cylindrical ceramic article is chucked between the opposed chuck heads at longitudinally opposite end portions of said ceramic article; (2) the elongated cylindrical article is held between the chuck heads under such a lower chucking pressure as allowing the ceramic article to slip inside a driven side chuck head while being kept inside the chuck heads at the opposite end portions, and the ceramic article is slipped inside the chuck heads for a given time under rotation of a driving chuck head so that any positional deviation between the location of a center axis passing the centers of the chuck heads and an axis of the ceramic article may be removed due to a self aligning centrifugal action of the ceramic article; (3) the chucking pressure of the chuck heads is raised to such a level as required for machining the ceramic article; and then a surface of the ceramic article is machined by the machining tool. Therefore, even if the axis of the elongated cylindrical ceramic article is deviated from the location of the center axis passing the centers of the chuck heads due to inappropriate chucking, variation in the shape or the like when the ceramic article is carried by the automatic carrier and chucked between the chuck heads before the machining, such a positional deviation is removed by slipping the elongated cylindrical ceramic article in the rotatable tailstock in the state that the ceramic article is chucked under a lower chucking pressure, and then the ceramic article is held under a higher chucking pressure. Accordingly, the ceramic article can be machined in the state that substantially no bending force is applied to the ceramic article. Consequently, the ceramic article can be machined at high accuracy having not been realized in the conventional process with respect to the axis of the shaft portion thereof as the reference. Further, since the positional deviation is removed by slipping the ceramic article under a lower chucking pressure until the machining tool contacts the article, and then the chucking pressure can be raised to such a higher level as to being suitable for the machining, the chucking and machining process according to the present invention can be carried out without influencing the machining cycle time in the conventional process.

What is claimed is:

1. A process for chucking and machining an elongated cylindrical article made of a ceramic material, comprising the steps of:

chucking the elongated cylindrical ceramic article between chuck heads at longitudinally opposite end portions of said ceramic article;

holding the elongated cylindrical article between the chuck heads under such a low chucking pressure as allowing the ceramic article to slip inside a driven side chuck head while being kept inside the chuck heads at the opposite end portions, and slipping the ceramic article inside the chuck heads for a given time under rotation of a driving chuck head so that any positional deviation between a location of a center axis passing centers of the chuck heads and an axis of the ceramic article may be removed due to a self aligning centrifugal action of the ceramic article;

raising the chucking pressure of the chuck heads to such a level as required for machining the ceramic article; and then machining a surface of the ceramic article.

2. The chucking and machining process set forth in claim 1, wherein said elongated cylindrical ceramic article is an engine valve made of the ceramic material and having a shaft portion and a head portion.

3. An apparatus for chucking and machining an elongated cylindrical article made of a ceramic material, said apparatus comprising:

a pair of chuck heads for chucking longitudinally opposite end portions of the elongated cylindrical ceramic article;

an applicator for applying a given chucking pressure upon the chuck heads;

a switch for switching the chucking pressure;

a driving unit for rotating the chuck heads; and a machining tool for machining the elongated cylindrical ceramic article chucked by the chuck heads;

wherein the chucking pressure-switching switch is switched; the elongated cylindrical ceramic article is held between the chuck heads under such a given low chucking pressure as to enable the ceramic article to slip within a driven side chucking head and the driving side chuck head is rotated to slip the elongated cylindrical ceramic article within at least the driven side chuck head so that any positional deviation between a location of a center axis passing centers of the chuck heads and a axis location of the elongated cylindrical ceramic article within the chuck heads may be removed; then the chucking pressure is raised to a given higher chucking pressure required for machining; and in this state a surface of the elongated cylindrical ceramic article is machined by the machining tool.

4. The chucking and matching apparatus set forth in claim 3, wherein the elongated cylindrical ceramic article is a ceramic engine valve comprising a shaft portion and a head seat portion.

5. The chucking and machining apparatus set forth in claim 3, wherein the chuck head-rotating unit is provided at one of the chuck heads.

6. The chucking and machining apparatus set forth in claim 5, wherein the chucking pressure applicator is provided at the other chuck head, and the given chucking pressure is always applied to the other chuck head in a chucking direction thereof when the apparatus is in operation.

7. The chucking and matching apparatus set forth in claim 3, wherein at least one of the chuck heads is made of a material softer than a ceramic material constituting the elongated cylindrical ceramic material.

* * * * *